United States Patent [19]

Engel

[11] Patent Number: 5,387,004

[45] Date of Patent: Feb. 7, 1995

[54] COUPLING ROD FOR JOINTED ATTACHMENT OF A U-SHAPE STABILIZER ARM

[75] Inventor: Michael Engel, Gifhorn/Winkel, Germany

[73] Assignee: Volkswagen AG, Wolfsburg, Germany

[21] Appl. No.: 585,148

[22] PCT Filed: Apr. 16, 1988

[86] PCT No.: PCT/EP88/00326

§ 371 Date: Sep. 24, 1993

§ 102(e) Date: Sep. 24, 1993

[87] PCT Pub. No.: WO89/09705

PCT Pub. Date: Oct. 19, 1989

[51] Int. Cl.$^6$ ............................................. B60G 21/04
[52] U.S. Cl. ................................... 280/673; 280/723; 267/273
[58] Field of Search ............... 280/716, 717, 721, 723, 280/673, 674; 267/273, 276, 188, 189

[56] References Cited

U.S. PATENT DOCUMENTS

| 2,027,577 | 1/1936 | Crane | 267/189 |
| 2,394,276 | 2/1946 | Venditty | 403/24 |
| 2,792,215 | 5/1957 | Timpner et al. | 267/189 |
| 3,311,364 | 3/1967 | De Castelet | 267/276 |
| 4,470,616 | 9/1984 | Kaneko et al. | 280/721 |

FOREIGN PATENT DOCUMENTS 6801096 10/1969 Germany .

*Primary Examiner*—Kenneth R. Rice
*Attorney, Agent, or Firm*—Brumbaugh, Graves, Donohue & Raymond

[57] ABSTRACT

In the particular embodiments described in the specification, the arms of a U-shaped vehicle stabilizer are connected by coupling rods to the lower transverse links on opposite sides of the vehicle and the coupling rods consist of a head to accommodate the stabilizer arm, a coupling rod pin received in the head and extending through a spherical bearing having an opening in the shape of a double-truncated cone and being connected to the lower transverse link. The coupling rod pin clamps opposed spherical surfaces in sliding relation to the spherical bearing.

10 Claims, 3 Drawing Sheets

COUPLING ROD FOR JOINTED ATTACHMENT OF A U-SHAPE STABILIZER ARM

BACKGROUND OF THE INVENTION

This invention relates to attachment arrangements for U-shaped stabilizer bars in motor vehicles and, more particularly, to a coupling for an articulated fastening coupling for such arms.

U-shaped stabilizer bars are generally joined to the chassis of a vehicle by way of rubber elastic bearings supporting the central portion, which is oriented more or less transverse to the lengthwise direction of the vehicle, while the arms of the stabilizer, which extend more or less lengthwise of the vehicle, have a jointed connection with the wheel-steering links or alternatively with the wheel mounts themselves. In principle, however, there are known arrangements, particularly in combination with rigid axles, in which the stabilizer arms are jointed to the chassis, while the central portion of the U-shaped stabilizer bar is connected to the steering links or to the axle.

In general, the jointed connection of the stabilizer arms is effected through coupling rods which are arranged to compensate for the unequal travels of the steering links on the one hand and of the stabilizer arms on the other hand, resulting from unlike suspension kinematics.

These differences in travel are especially great in the case of a transverse link axle or a spring leg/transverse link axle such as is conventional in modern front-wheel-drive vehicles. In such arrangements, the stabilizer arms are supported about an axis of rotation extending transverse to the longitudinal axis of the vehicle, while the transverse links, and hence also the points of action of their coupling rods, are supported about an axis extending more or less lengthwise of the vehicle.

To compensate for the differences in travel that occur, therefore, the coupling rods are commonly supported from both the stabilizer arm and the steering link and/or the chassis by rubber elastic elements. See, for example, U.S. Pat. No. 2,027,577 and German Utility Design No. 6,801,096.

Instead of using coupling rods and joints, however, it is also common practice, as described in U.S. Pat. No. 2,792,215, to attach the stabilizer arms of a U-shaped stabilizer, which extend generally lengthwise of the vehicle, directly and relatively rigidly to the steering links by embedding them in prestressed rubber blocks of comparatively large volume and to suspend the central portion, which extends transverse to the lengthwise direction of the vehicle, from spaced coupling-rod-like attachment members which are attached by rubber elements to the vehicle chassis and are spherically movable therein.

SUMMARY OF THE INVENTION

Accordingly, it is an object of the present invention to provide a coupling arrangement for a U-shaped stabilizer arm which overcomes the above-mentioned disadvantages of the prior art.

Another object of the invention is to provide a coupling rod of simple manufacture for jointed attachment of a U-shaped stabilizer arm which can transmit the stabilizing forces to the steering links with improved efficiency and increased angular mobility and which insofar as possible requires but little installation space and is especially suitable for automated assembly of the stabilizer.

These and other objects of the invention are attained by providing a coupling rod for a stabilizer arm which includes a coupling rod head to accommodate the stabilizer arm and a coupling rod pin with a spherically movable bearing for attachment to a support member such as the chassis or a steering link. Preferably, the coupling rod head and the coupling rod pin are separate parts and the coupling rod pin is in the form of a threaded bolt received in the coupling rod head.

In a preferred embodiment, the spherically movable bearing has a body capable of being connected in geometrically fixed relation to a steering link or the like and the body has a central through-bore of double-truncated cone shape traversed by a pin, the smallest diameter of the bore more or less corresponding to the diameter of the coupling rod pin. The bearing also includes two sliding shells having part-spherical surfaces bearing on the pin and enclosing a portion of the essentially spherical outer periphery of the bearing body. Such sliding shells are disclosed in U.S. Pat. No. 2,394,276. That bearing, however, serves as a spherically movable attachment of the lower end of a telescoping shock absorber to a motor vehicle axle. The kinematic situation encountered in that arrangement is not comparable to that of a jointed attachment of a U-shaped stabilizer arm.

The coupling rod according to the invention affords especially great angular mobility with an ideal theoretical center of rotation. Thus, the Cardanic strain on the coupling rod itself becomes negligibly small, since it no longer has any rubber elastic stresses to assume in view of the elimination of the otherwise conventional rubber elastic elements. As a result, the interference of the elasticity of rubber elastic elements is eliminated and stabilizer efficiency is significantly improved as well. Therefore, not only may the coupling rod itself be made smaller, or alternatively made of a more economical material than conventional coupling rods, but also the U-shaped stabilizer may be made smaller, with a corresponding reduction in weight and cost.

Since, moreover, there will no longer be relative movements between the rubber elastic elements ordinarily used and the metal parts normally cooperating therewith, an improved corrosion resistance will result as well.

In addition to these general functional improvements achieved, important improvements in economical manufacture of the coupling rod itself and as to final assembly of the stabilizer/coupling rod system are also attained.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
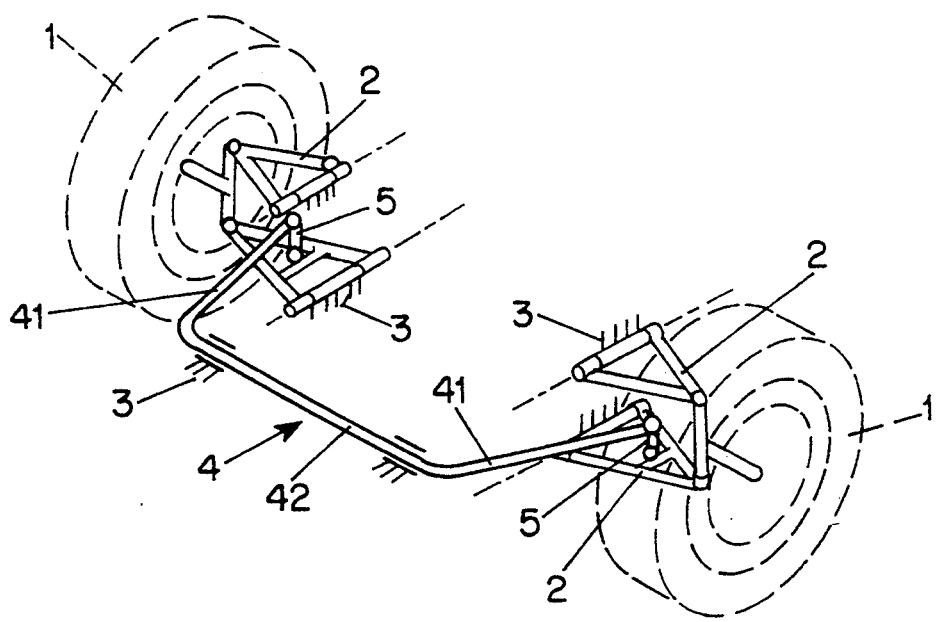
FIG. 1 is a schematic fragmentary perspective view showing the connection of the arms of a U-shaped stabilizer to the lower transverse links of a double transverse-line axle of a motor vehicle in a representative embodiment of the invention.

In the typical embodiment shown schematically in FIG. 1, a double transverse link axle is illustrated wherein two vehicle wheels 1, shown in dotted outline, are each swingably connected to the chassis 3 of the vehicle, which is only indicated in the drawing. The suspension system for the vehicle is not explicitly represented in the drawing. A U-shaped stabilizer bar 4, swingably supported at its central portion 42 from the chassis of the vehicle in a conventional manner, has two arms 41 extending more or less lengthwise of the vehicle. The arms 41 are joined in a constraint-free manner to the lower of two transverse links 2 on each side by way of a coupling rod 5 having a special configuration.

Figure 2:
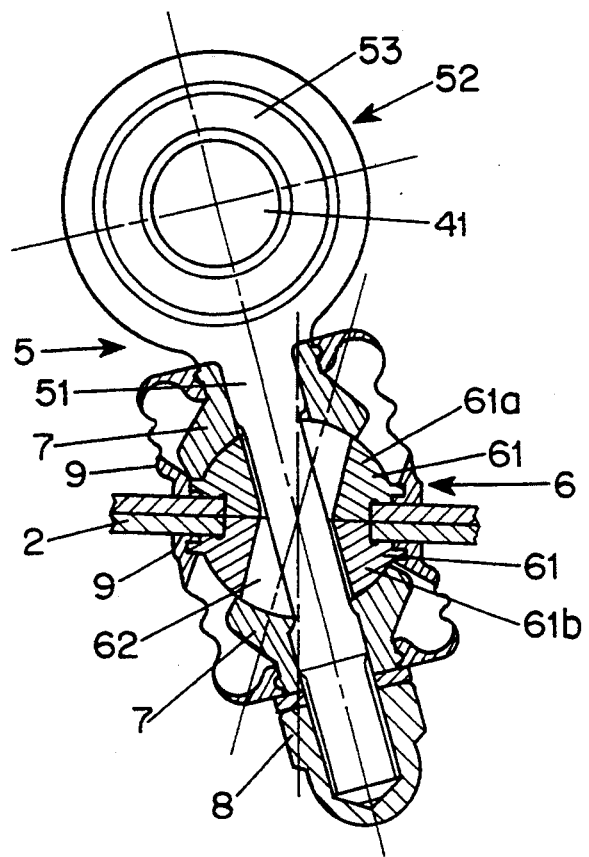
FIG. 2 is a view in longitudinal section illustrating the coupling rod in one embodiment of the invention.
Figure 3:
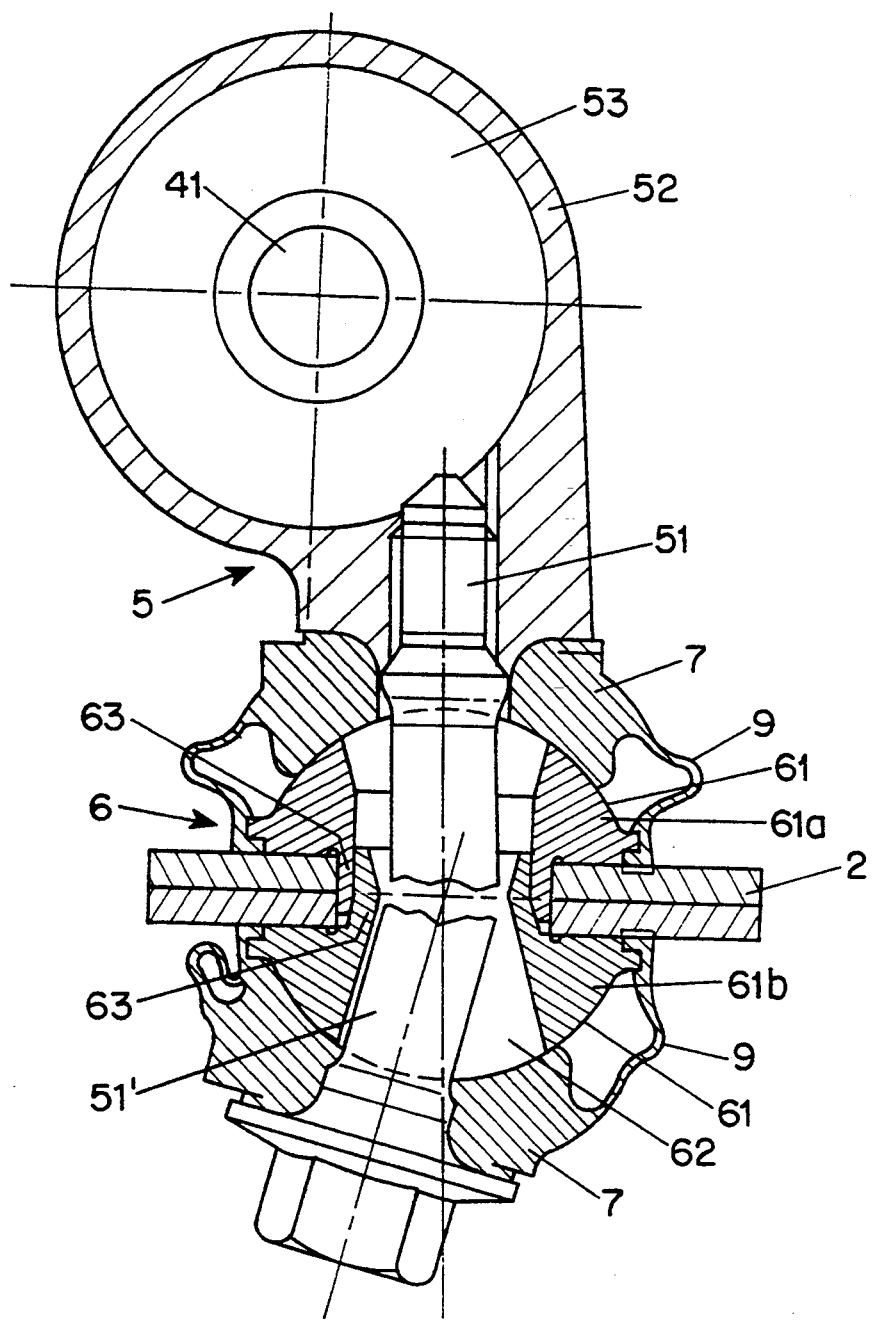
FIG. 3 is a view in longitudinal section showing the coupling rod in another embodiment of the invention.
Figure 4:
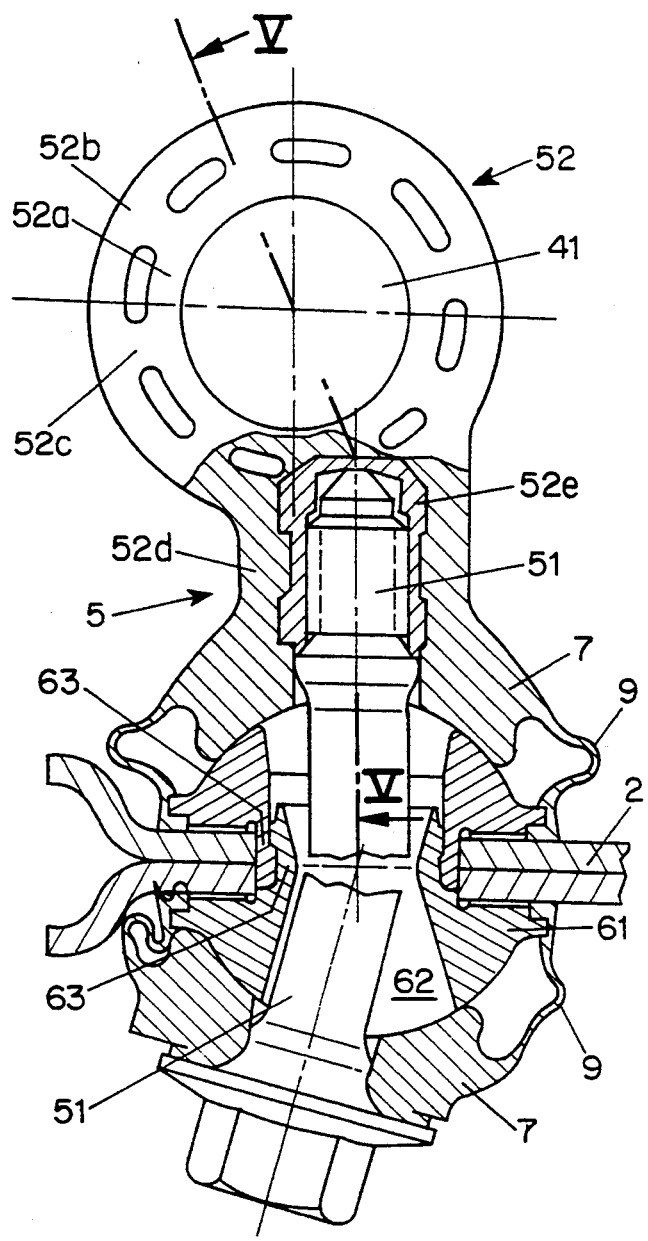
FIG. 4 is a sectional view taken along the line IV—IV of FIG. 3 and looking in the direction of the arrows.
Figure 5:
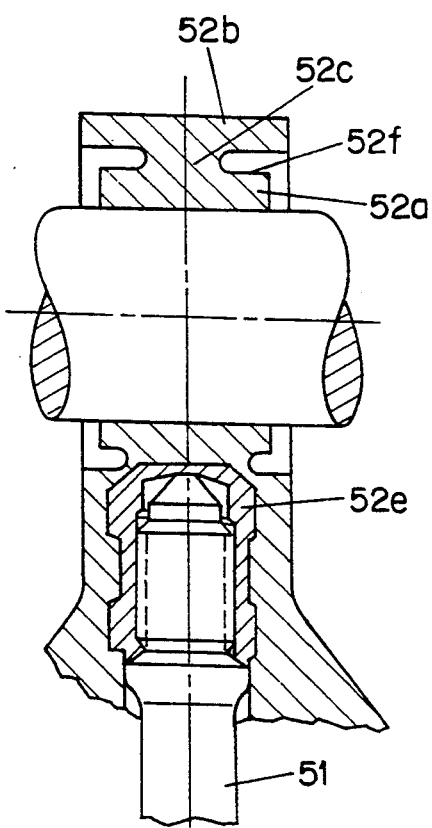
FIG. 5 is a sectional view taken along the line V—V of FIG. 4 and looking in the direction of the arrows.

As shown in FIGS. 2-4, the coupling rod 5 according to the invention consists essentially of a coupling rod head 52 to accommodate the stabilizer arm 41 and a coupling rod pin 51 connected, in the illustrated examples, to the transverse link 2. In the coupling rod head 52, a ring part 53 is provided, here only schematically indicated, in which the stabilizer arm 41 is accommodated and which is itself surrounded by the coupling rod head 52. The ring part 53 may consist of an inner hard rubber ring accommodating the stabilizer arm 41 and an outer plastic ring attached to the inner ring and having a convex outer contour with good sliding properties. As as result, the stabilizer arm 41 can be moved free from constraint inside the coupling rod head 52.

The coupling rod pin 51 is attached to the steering link 2 by way of a bearing 6 arranged to permit relative spherical movements. This bearing consists of a body 61 capable of being connected in geometrically fixed relation to the steering link 2 and having a substantially spherical outer periphery, and two sliding shells 7 mounted on the coupling rod pin, which shells are located diametrically opposed to each other with respect to the bearing body 61 and enclose a portion of the spherical outer surface of the bearing body 61. The body 61 has a through-bore 62 which is traversed by the coupling rod pin 51 and which has the shape of a generally symmetrical double-truncated cone. The smallest diameter of the bore 62 is located at about the center of the bearing body and is dimensioned slightly larger than the diameter of the coupling rod pin 51. The coupling rod pin 51, guided by the shells, is therefore able to be swung about a point in the center of the bearing body inside the body 61, and the double cone periphery of the through-bore 62 determines the maximum extent of swing. In the lower part of FIGS. 2 and 3, the coupling rod pin is illustrated in a maximally swung position and is marked 51'.

The bearing body 61, preferably made of plastic, may, if desired, be made in one piece. It is more advantageous in terms of manufacture and assembly, however, to assemble it from two hemispheres 61a and 61b, as shown in FIG. 2.

It is easily seen that the device according to the invention affords a comparatively great angular mobility, in connection with which constraints cannot occur.

The coupling rod is composed of two separate parts, the coupling rod head 52 and the coupling rod pin 51. The coupling rod pin 51, in the illustrated embodiments, is in the form of a threaded bolt screwed into the coupling rod head 52 so as to hold the two sliding shells 7 which rest upon it, as well as the bearing body 61, together in a fairly snug sliding connection permitting spherical movements. If desired, however, the coupling rod pin may alternatively be inserted in the coupling rod head and connected thereto by a snap connection or the like.

As a result of the configuration of the coupling rod pin 51 as a threaded bolt capable of being screwed into or a peg capable of being inserted in the coupling rod head 52, only a comparatively short structural length of the coupling rod is necessary, because the threaded length otherwise required for assembly is wholly accommodated in the head of the coupling rod.

Furthermore, because of the division of the coupling rod 5 into two parts, it is possible to make the manufacture of the assembly less expensive and more convenient. Instead of a comparatively costly part forged in one piece, with a shank and thread which must be finished in separate operations, the pin of the coupling rod according to the invention may have the configuration of a high-strength but very economical cold-formed part in which it only remains to machine the thread and the like. The coupling rod head 52, on the other hand, depending on requirements, may be made as a simple welded part, a casting (for example, gray-cast iron or aluminum) or a sintered part, or else a plastic part, where cast, sintered and plastic parts especially afford additional design opportunities.

The division of the coupling rod into two parts also decisively improves, or perhaps permits in the first place, an automated assembly of the stabilizer.

In conventional assembly procedures, the U-shaped stabilizer bar is preassembled on the vehicle chassis and the two coupling rods are fixed to the stabilizer arms. In the case of one-piece coupling rods with comparatively long pins, the pins would then have to be threaded carefully into the mounting, for example, into the through-bore, of the spherical bearing body which has previously been attached to the steering links, at final assembly. In practice, this could only be done manually, because an automated threading operation would entail a large expense for the automatic control mechanism.

By virtue of the bipartite coupling rod, however, automated assembly becomes comparatively simple. In this case, the comparatively short coupling rod head 52, preassembled on the stabilizer arm 41, can be positioned with very little effort over the bearing body 61, which in turn is preassembled in the steering link 2 in such a way that its threaded hole will be located exactly over the through-bore 62 of the bearing head 61. As a result, the threaded bolt forming the coupling rod pin 51 need only be inserted by automated means in the through-hole 62 from below and screwed into the coupling rod head 52.

To prevent fouling of the bearing 6 and preserve the easy angular mobility of the device for a long time, the bearing 6 is sealed from the outside by means of elastic dust seals 9.

Special advantages result if the dust seals 9, as in the embodiment shown in the drawings, are configured not as separate parts, but are each formed in one piece on the two spherical-shaped sliding shells 7.

Such a one-piece configuration is made possible if the sliding shells 7 are made of an elastic synthetic material, preferably an elastic polyester, such as is distributed, for example, by DuPont under the trademark Hytrel.

The elastic polyester Hytrel is especially well-suited to manufacture of the sliding shells 7 with sealing sleeves 9 formed on in one piece because it can provide, in the case of thicker-walled parts, such as, for example, the sliding shells 7, a high rigidity, and also, in the case of thin-walled parts, such as, for example, the dust seals 9, high flexibility, qualities, that is, which are often mutually exclusive. In the embodiments shown in the drawings, the two spherical-shaped sliding shells 7, made of such an elastic polyester, each have thin-walled rotationally symmetrical axial prominences 9 formed in one piece, in the form of bellows-shaped sleeves, with their facing free ends meeting sealingly in each instance in the region of connection between steering link 2 and bearing body 61.

By virtue of the sealing sleeves 9 being formed on in one piece, not only is the assembly of the system facilitated, but also more favorable dimensions and better dimensional stability of the sliding shell/seal unit, as well as of the system as a whole, will result, with manifest advantages in later final assembly of the stabilizer system as well.

In the embodiment shown in FIGS. 3 and 4, by way of example, a bipartite coupling rod is provided in which the coupling rod head 52 itself also is made of an elastic synthetic material, preferably an elastic polyester of the Hytrel kind. In this embodiment, the coupling rod head 52, the spherical-shaped sliding shell adjacent to it, and the associated dust seal 9 are integrated into a one-piece part.

Here the coupling rod head 52 has a substantially rigid annular inner part 52a to accommodate the stabilizer arm 41 and a likewise substantially rigid outer part 52b annularly enclosing the inner part 52a and having an accommodating part 52d shaped to accommodate the coupling rod pin 51. The inner part is connected to the outer part 52b by webs 52c or the like distributed along its circumference so that it is able, within limits, to execute both Cardanic movements and angular movements in the circumferential direction relative to the outer part.

As illustrated in the sectional representation of FIG. 4, the webs 52c are considerably smaller in axial direction than either the outer part 52b or the inner part 52a as a result of corresponding axial recesses 52f.

In the illustrated embodiment, a metal threaded insert 52e is set into the plastic coupling rod head 52 to accommodate the threaded end of the coupling rod pin 51. Depending on the loads applied to the coupling rod, such a metal insert may, if desired, be dispensed with.

Specifically in the case of coupling rod heads made of plastic, it is possible alternatively, at least in the case of low coupling rod loads, to make the coupling rod pin 51 in the form of a peg capable of being inserted in the coupling rod head and fixed in position therein by means of a snap connection or the like.

The spherical bearing body 61, in the illustrated embodiments, is composed of two hemispheres 61a and 61b. On their opposing circular faces, these have radially internal annular or similar axial projections 63 located concentrically with the longitudinal axis of the double-truncated cone-shaped through-bore 62. The projections 63 are of radially springing configuration and are dimensioned so that the two hemispheres have their axial projections self-centeringly inserted one into the other and interconnected in the manner of a snap fastening.

The self-centering of the preferably injection-molded plastic hemispheres 61a and 61b by means of the annular snap connection, independently of the prevailing installation conditions, affords a very precise pivot for the swinging movements of the coupling rod pin 51, with obvious advantages in terms of articulation and, moreover, minimizing wear in the bearing/shell region.

The coupling rod according to the invention permits comparatively large angular movements with an extremely exact pivot for the swinging movements of the coupling rod pin, helping to minimize bearing/shell wear as well as to further relieve the coupling rod, already relieved by elimination of conventional rubber elastic elements. By virtue of the special configuration of the bipartite bearing body and the sliding shells with associated sealing sleeves, dimensional precision is improved and, also, the considerable independence of the exact center of rotation from installation conditions is enhanced. The bipartition of the coupling rod itself results in an especially compact unit, requiring, that is, comparatively little space and hence is highly economical to manufacture, and having the substantial additional advantage of being specially suited to automated assembly.

The coupling rod according to the invention is not limited to the application of a double transverse link axle as represented in FIG. 1. It may advantageously be employed also for other types of axles, for example, a spring leg/transverse link axle commonly used as the front axle for modern front-wheel-drive vehicles.

In departure from the embodiment by way of example, it is also possible in general to employ the coupling rod according to the invention for stabilizer systems in which the stabilizer arms are connected not to the steering links but to the chassis of the vehicle and the central portion of the stabilizer in turn is connected to the steering links or to the body of the axle, as the case may be.

Although the invention has been described herein with reference to specific embodiments, many modifications and variations therein will readily occur to those skilled in the art. Accordingly, all such variations and modifications are included within the intended scope of the invention.

I claim:

1. A coupling rod for jointed attachment of a U-shaped stabilizer arm in a motor vehicle comprising a coupling rod head to accommodate the stabilizer arm and a coupling rod pin separate from the head with a bearing associated therewith for spherically movable attachment to a cooperating member, the coupling rod pin being in the form of a member capable of being inserted into the coupling rod head and held in position therein, the bearing comprising a body capable of being connected in geometrically fixed relation to the cooperating member and having a through-bore of double-truncated cone shape traversed by the coupling rod pin, the smallest diameter of the bore corresponding approximately to the diameter of the coupling rod pin and being located generally centrally in the bearing body, and two spherical-shaped sliding shells carried by the coupling rod pin and enclosing a portion of the essentially spherical outer periphery of the bearing body, the sliding shells and the bearing body traversed by the coupling rod pin being held in sliding connection with each other, permitting relative spherical movements.

2. A coupling rod according to claim 1 wherein the coupling rod head is made of a material selected from the group consisting of cast, welded or sintered metal parts or plastic, and the coupling rod pin is in the form of a high-strength cold-formed part.

3. A coupling rod according to claim 2 wherein the coupling rod head is made of an elastic synthetic material.

4. A coupling rod according to claim 3 including a threaded metal insert set into the coupling rod head to accommodate the coupling rod pin.

5. A coupling rod according to claim 3 or claim 4 wherein the coupling rod head comprises an essentially rigid annular inner part to accommodate the stabilizer arm and an essentially rigid outer part enclosing the inner part with an accommodating part to accommodate the coupling rod pin, and wherein the inner part is connected to the outer part in such manner that the inner part is capable of executing limited Cardanic movements and angular movements in the circumferential direction relative to the outer part.

6. A coupling rod according to claim 5 including a spherical-shaped sliding shell formed in one piece onto the accommodating part of the coupling rod head.

7. A coupling rod according to claim 6 including a thin-walled rotationally symmetrical projection formed in one piece onto the spherical-shaped sliding shell having the form of a bellows-like sealing sleeve to protect the bearing body from dirt entering from the outside.

8. A coupling rod according to claim 1 wherein the spherical-shaped sliding shells are made of an elastic synthetic material and have thin-walled rotationally symmetrical projections formed in one piece in the shape of bellows-like sealing sleeves to protect the bearing body from dirt entering from the outside.

9. A coupling rod according to claim 1, wherein the bearing body is made of two hemispheres which are self-centeringly fixed to eachother by means of an annular snap connection located concentrically with the longitudinal axis of the double-truncated cone-shaped through-bore.

10. A coupling rod according to claim 9, wherein the two hemispheres of the bearing body are injection-molded plastic parts having, on their opposing circular faces, radially internal annular or similar axial projections located concentrically with the longitudinal axis of the double-truncated cone-shaped through-bore, said projections being of radially springing configuration and dimensioned as to inert one into the other thereby interconnecting the two hemispheres in the manner of a snap fastening.

* * * * *